UNITED STATES PATENT OFFICE.

FRANK G. BREYER, OF PALMERTON, PENNSYLVANIA.

RECOVERY OF POTASH.

1,236,903. Specification of Letters Patent. Patented Aug. 14, 1917.

No Drawing. Application filed August 26, 1915. Serial No. 47,516.

*To all whom it may concern:*

Be it known that I, FRANK G. BREYER, a citizen of the United States, residing at Palmerton, in the county of Carbon and State of Pennsylvania, have invented certain new and useful Improvements in the Recovery of Potash; and I do hereby declare the following to be a full, clear, and exact description of the invention, such as will enable others skilled in the art to which it appertains to make and use the same.

My invention relates to the recovery of potash from carbonaceous material and refuse, such as shales, slates, peats, bony coals, waste coal, culm, etc., which are relatively low in carbon content and in calorific value but high in ash constituents, and particularly from the material constituting the refuse slate dumps produced in the mining and preparation of coal.

In carrying out the invention, various types of combustion furnaces can be used, inasmuch as the process is primarily a combustion process. I have found, however, that the process can be practised in a simple and advantageous manner in an ordinary pig iron blast furnace, which is operated in the customary manner of such furnaces. In using such a furnace, the carbonaceous material or refuse from the dumps, along with the rejections from the operations of the collieries of similar nature to the dump material, is charged into the furnace, together with the proper addition of limestone to form a slag with the ash present in the charge. The carbonaceous material itself contains sufficient carbon to support combustion and melt the charge and produce the slag.

Owing to the intense heat of the furnace, and the reactions brought about by the added limestone, the potash is volatilized from the charge and escapes from the top of the furnace together with the products of combustion. From such escaping products of combustion the potash is separated and caught in suitable dry dust catchers, or wet gas scrubbers, in the form of water soluble salts or solutions.

The dry dust catchers may be of the type commonly used with blast furnaces, either alone or in connection with bag houses, such as are commonly used to catch metallurgical fumes, or electrical precipitators, such as those of the Cottrell type, etc. With suitable dust catchers, or scrubbers, substantially quantitative separation and recovery of the potash can be obtained.

In practising the process of the invention in an ordinary pig iron blast furnace, the operation is continuous. The carbonaceous refuse and limestone are charged into the top of the furnace, and the slag is tapped out at intervals at the bottom. The potash-carrying dust or solution is removed from time to time from the dust catchers, bag houses, scrubbers, etc.

Instead of using a blast furnace, the process can be practised in other types of furnaces, such as those provided with stationary or traveling grates. The carbonaceous refuse is burned on the grates with more or less limestone. Further additions of culm coal of relatively higher carbon content and calorific value may be made, with advantage, particularly when the carboniferous refuse is of low carbon content and calorific value. Thereby the calorific value of the charge is increased, so that it is possible to utilize slate refuse which is itself too poor in carbon to support combustion and to give the required temperature. The volatilized potash is caught and separated in a manner similar to that already described.

Similar additions of culm of relatively higher calorific value can also be made to the blast furnace charge, when the blast furnace is used.

In order to increase the output of the furnaces, and the yield of potash, various minerals rich in potash, such as feldspar, greensand, alunite, etc., can be added to the carbonaceous charge. Since the process is a combustion process, the heat produced during the combustion is made available for effecting the separation of the potash from the mineral thus added, so that there results both the potash from the carbonaceous material itself and that from the added potash-containing material.

It is also advantageous, in some cases, to add sufficient limestone to the carbonaceous charge to give a slag or clinker having the composition of cement clinker, from which cement can be made by suitable grinding. Thus, when the process is practised in a blast furnace, the added limestone is calculated so as to produce, with the mineral constituents of the carbonaceous material, a slag of suitable composition for use as cement.

From the above description, it will be seen that the process of the present invention is a combustion process, making use of waste carbonaceous material and refuse, and recovering, from such materials, their potash values; and that where other potash containing minerals are added to the charge, the process becomes one for recovering the potash from these added minerals, as well as from the carbonaceous material itself.

I claim:

1. The process of recovering potash from carbonaceous material and refuse relatively low in carbon content and high in ash constituents, which comprises burning such material, with suitable additions of limestone to combine with the ash constituents, at a temperature sufficient to volatilize the potash, and separating the volatilized potash from the resulting products of combustion; substantially as described.

2. The process of recovering potash from carbonaceous material and refuse relatively low in carbon content and high in ash constituents, which comprises burning such material, with suitable additions of limestone to combine with ash constituents and of culm coal of higher calorific value, at a temperature sufficient to volatilize the potash, and separating the volatilized potash from the resulting products of combustion; substantially as described.

3. The process of recovering potash from carbonaceous material and refuse relatively low in carbon content and high in ash constituents, which comprises burning such material in a blast furnace, with suitable additions of limestone to form a slag, at a temperature sufficient to volatilize the potash, and separating the volatilized potash from the escaping products of combustion; substantially as described.

4. The continuous process of recovering potash from carbonaceous material and refuse relatively low in carbon content and high in ash constituents, which comprises burning such material in a blast furnace, with suitable additions of limestone to form a slag, at a temperature sufficient to volatilize the potash and produce a slag, charging further amounts of the carbonaceous material and limestone into the top of the blast furnace, tapping off the slag from the bottom of the furnace, and separating the volatilized potash from the products of combustion escaping at the top of the furnace; substantially as described.

5. The process of recovering potash from carbonaceous material and refuse relatively low in carbon content and high in ash constituents, which comprises burning such material, with suitable additions of limestone to combine with the ash constituents and of minerals rich in potash, at a temperature sufficient to volatilize the potash, and separating the volatilized potash from the resulting products of combustion; substantially as described.

6. The continuous process of recovering potash from carbonaceous material and refuse relatively low in carbon content and high in ash constituents, which comprises burning such material in a blast furnace, with suitable additions of minerals rich in potash and of limestone to form a slag, at a temperature sufficient to volatilize the potash and produce a slag, charging further amounts of the carbonaceous material, rich potash mineral and limestone into the top of the blast furnace, tapping off the slag from the bottom of the furnace, and separating the volatilized potash from the products of combustion escaping at the top of the furnace; substantially as described.

7. The process of recovering potash from carbonaceous material and refuse relatively low in carbon content and high in ash constituents, which comprises burning such material, with suitable additions of limestone to form a slag or clinker having the composition of cement clinker, at a temperature sufficient to volatilize the potash, and separating the volatilized potash from the resulting products of combustion; substantially as described.

8. The continuous process of recovering potash from carbonaceous material and refuse relatively low in carbon content and high in ash constituents, which comprises burning such material in a blast furnace, with suitable additions of limestone to form a slag having the composition of cement clinker, at a temperature sufficient to volatilize the potash, and separating the volatilized potash from the escaping products of combustion; substantially as described.

In testimony whereof I affix my signature.

FRANK G. BREYER.